(12) United States Patent
Yang et al.

(10) Patent No.: US 8,190,549 B2
(45) Date of Patent: May 29, 2012

(54) ONLINE SPARSE MATRIX GAUSSIAN PROCESS REGRESSION AND VISUAL APPLICATIONS

(75) Inventors: Ming-Hsuan Yang, Santa Clara, CA (US); Ananth Ranganathan, Atlanta, GA (US)

(73) Assignee: Honda Motor Co., Ltd., Tokyo (JP)

( * ) Notice: Subject to any disclaimer, the term of this patent is extended or adjusted under 35 U.S.C. 154(b) by 804 days.

(21) Appl. No.: 12/276,128

(22) Filed: Nov. 21, 2008

(65) Prior Publication Data

US 2009/0164405 A1  Jun. 25, 2009

Related U.S. Application Data

(60) Provisional application No. 61/016,296, filed on Dec. 21, 2007.

(51) Int. Cl.
G06F 17/00 (2006.01)
G06N 5/02 (2006.01)
(52) U.S. Cl. .............................. 706/46; 706/45; 706/12
(58) Field of Classification Search ........................ None
See application file for complete search history.

(56) References Cited

U.S. PATENT DOCUMENTS 5,630,154 A     5/1997  Bolstad et al.
2005/0286764 A1  12/2005  Mittal et al.

OTHER PUBLICATIONS

Williams et al., O., "Sparse Bayesian Learning for Efficient Visual Tracking", IEEE Transactions on Pattern Analysis and Machine Intelligence, vol. 27, No. 8, pp. 1292-1312, Aug. 2005.*
Kersten et al., T., "Sequential Estimation of Sensor Orientation for Stereo Images Sequences", International Archives of Phoogrammetry and Remote Sensing, vol. 30, Part 5, pp. 1-6, 1994.*
Ranganathan et al., A., "Online Sparse Matrix Gaussian Process Regression and Vision Applications", ECCV 2008, Part I, pp. 468-482, 2008.*
Khan et al., Z., "MCMC Data Associationand Sparse Factorization Updating for Real Time Multitarget Tracking with Merged and Multiple Measurements", IEEE Transactions on Pattern Analysis and Machine Intelligence, vol. 28, No. 12, pp. 1960-1972, Dec. 2006.*
Mery et al., D., "Tracking of Points in a Calibrated and Noisy Image Sequence", ICIA R. 2004, pp. 647-657, 2004.*
Zhang et al., J., "Binocular Transfer Methods for Point-Feature Tracking of Image Sequences", IEEE Transactions on Systems, Man and Cybernetics—Part C Applications and Reviews, vol. 32, No. 4, pp. 392-405, Nov. 2002.*
Bjorck, A., et al., "Accurate downdating of Least-Square Solutions". Siam Journal on Matrix Analysis and Applications 15 (1994), pp. 549-568.

(Continued)

*Primary Examiner* — Jeffrey A Gaffin
*Assistant Examiner* — Adrian Kennedy
(74) *Attorney, Agent, or Firm* — Fenwick & West LLP; Mark Duell

(57) ABSTRACT

An online sparse matrix Gaussian process (OSMGP) uses online updates to provide an accurate and efficient regression for applications such as pose estimation and object tracking. A regression calculation module calculates a regression on a sequence of input images to generate output predictions based on a learned regression model. The regression model is efficiently updated by representing a covariance matrix of the regression model using a sparse matrix factor (e.g., a Cholesky factor). The sparse matrix factor is maintained and updated in real-time based on the output predictions. Hyperparameter optimization, variable reordering, and matrix downdating techniques can also be applied to further improve the accuracy and/or efficiency of the regression process.

28 Claims, 9 Drawing Sheets

OTHER PUBLICATIONS

Csato, L., et al., "Sparse Online Gaussian Processes", Neural Computation 14 (2002), pp. 641-669.

Davis, T., et al., "A Column Approximate Minimum Degree Ordering Algorithm" ACM Trans. Math. Softw. 30 (2004), pp. 353-376.

Hamers, B., et al., "Compactly Supported RBF Kernels for Sparsifying the Gram Matrix in LS-SVM Regression Models." in: Proceedings of the International Conference on Artificial Neural Networks (2002), pp. 720-726.

Kaess, M., et al., "Fast Incremental Square Root Information Smoothing", in: Intl. Joint Conf. on Artificial Intelligence. (2007), pp. 2129-2134.

Kernighan, B., et al., "An Efficient Heuristic Procedure for Partitioning Graphs" The Bell System Technical Journal 49 (1970), pp. 291-307.

Quinonero-Candela, J., et al., "Approximation Methods for Gaussian Process Regression" in: Large-Scale Kernel Machines. MIT Press (2007), pp. 203-224.

Ross, D., et al., "Incremental Learning for Robust Visual Tracking" International Journal of Computer Vision 1-3 (2008), pp. 125-141.

Viola, P., et al., "Rapid Object Detection Using a Boosted Cascade of Simple Features". In: IEEE Conf. on Computer Vision and Pattern Recognition. vol. 1 (2001), pp. 511-518.

Zhao, K., et al., "Sliding Window Order-Recursive Least-Squares Algorithms" IEEE Trans. Acost., Speech, Signal Processing 42 (1994), pp. 1961-1972.

PCT International Search Report and Written Opinion, PCT/US08/84569, Jan. 26, 2009, 9 Pages.

\* cited by examiner

US 8,190,549 B2

ONLINE SPARSE MATRIX GAUSSIAN PROCESS REGRESSION AND VISUAL APPLICATIONS

RELATED APPLICATIONS

This application claims priority from U.S. provisional application No. 61/016,296 entitled "Fast Human Pose Estimation Using Appearance and Motion via Multi-Dimensional Boosting Regression" filed on Dec. 21, 2007, the content of which is incorporated by reference herein in its entirety.

BACKGROUND

1. Field of Art

The invention generally relates to computer vision, and more specifically, to an online regression process for computer vision applications.

2. Description of the Related Art

Learning regression functions from data is an important problem in machine learning and computer vision with numerous applications. Particularly, kernel machines using Gaussian Processes have demonstrated success in learning nonlinear mappings between high dimensional data and their low dimensional representations. For example, in pose estimation applications, a regression model is learned from a sequence of training images having subjects with known pose configurations. Once learned, the regression model can be applied to input images to generate pose estimations based on the training data. Regression models can further be applied to object tracking problems or other related computer vision applications.

A problem with traditional regression processes is that the computation for learning the regression function does not scale linearly with the number of training data points. Rather, using traditional techniques, learning the regression model is $O(n^3)$ in complexity, where n is the size of the training data set. Therefore, such processes can be become computationally burdensome for applications with large datasets. Furthermore, using traditional processes, it may be computationally unfeasible to provide online updates to the regression model. Such online updates refine the regression model based on the current input images and output predictions and can significantly improve the accuracy of the regression.

Several efforts have previously been made to reduce the computational complexity of the regression learning. Examples of such efforts are described in Snelson, E. and Ghahramani, Z.: "*Gaussian Processes for Machine Learning*" MIT Press (2006); Csato, L. and Opper, M.: "*Sparse Online Gaussian Processes*", Neural Computation 14 (2002) 641-669; and Quinonero-Candela, J., Rasmussen, C., and Williams, C.: "*Approximation Methods for Gaussian Process Regression*" In: Large-Scale Kernel Machines. MIT Press (2007) 203-224, the contents of which are all incorporated by reference herein in their entirety. However, each of these approaches involves an approximation to the regression process that decreases the accuracy of the estimation. These traditional techniques are unable to reduce computation enough to allow for real-time online updates to the regression model while maintaining sufficient accuracy for complex applications such as pose estimation and object tracking. Therefore, what is needed is an improved system and method for fast and accurate regression learning using online updates.

SUMMARY

A system, method, and computer program product for generating tracking information of an object in a sequence of input images using an online sparse matrix Gaussian process regression. An input controller receives an input image from a sequence of input images. A regression calculation module receives a regression module that includes a covariance matrix represented by a sparse matrix factor (e.g., a Cholesky factor). The regression model is applied to the input image to generate an output prediction representing tracking information for the object in the received image. Furthermore, an online update module generates an updated regression model by applying an update to the sparse matrix factor based on the output prediction.

In one embodiment, the online update module computes a factorization of the covariance matrix by incrementally applying one or more Givens rotation. The Givens rotation zeroes out entries of the covariance matrix below a diagonal of the covariance matrix and generates an updated sparse matrix factor. This update can advantageously be performed as an $O(n)$ runtime operation, where n is the number of images used to the train the regression model.

Furthermore, the online update to the regression model may comprise removing an oldest input image from the covariance matrix such that the covariance matrix maintains a constant size when a new input is added. Then the online update module computes a factorization of the covariance matrix by incrementally applying one or more Hyperbolic rotations to the covariance matrix to zero out entries of the covariance matrix below the diagonal.

Additionally, the online update module may periodically update hyperparameters of the regression model and/or apply a variable reordering to the covariance matrix of the regression model. These steps refine and improve the regression model based on recent input data and maintain the sparsity of the covariance matrix to ensure efficient runtime operation.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

System Architecture

A preferred embodiment of the present invention is now described with reference to the figures where like reference numbers indicate identical or functionally similar elements. Also in the figures, the left most digit of each reference number corresponds to the figure in which the reference number is first used.

Figure 1:
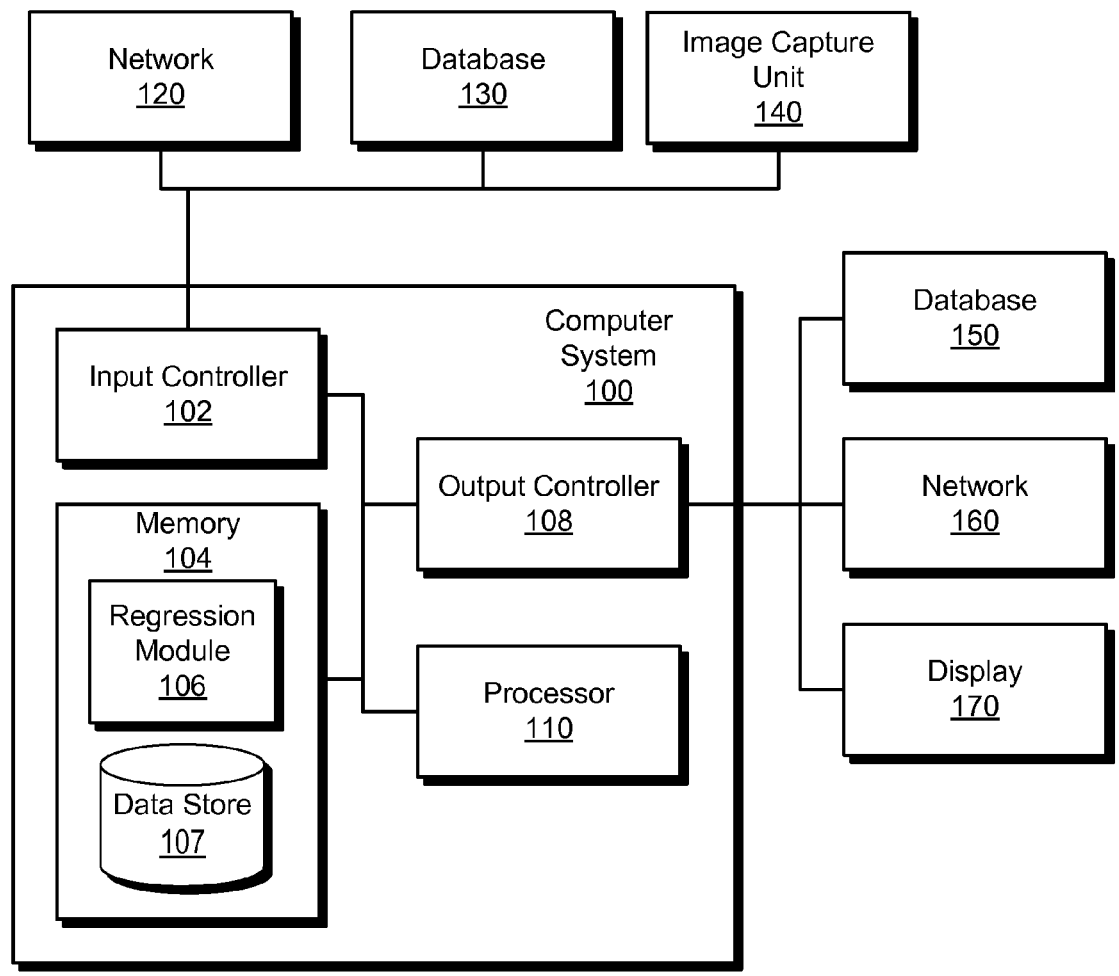
FIG. 1 is an example computer system in accordance with an embodiment of the present invention.

FIG. 1 is an illustration of a computer system 100 in which an embodiment of the present invention may operate. The computer system 100 includes a processor 110, an input controller 102, an output controller 108, and a memory 104.

The processor 110 processes data signals and may comprise various computing architectures such as a complex instruction set computer (CISC) architecture, a reduced instruction set computer (RISC) architecture, or an architecture implementing a combination of instruction sets. Although only a single processor is shown in FIG. 1, multiple processors may be included. The processor 110 may comprises an arithmetic logic unit, a microprocessor, a general purpose computer, or some other information appliance equipped to transmit, receive and process electronic data signals from the memory 104, the input controller 102, or the output controller 108.

The input controller 102 is any device configured to provide input (e.g., a video input) to the computer system 100. In one embodiment, the input controller 102 is configured to receive an input image sequence from one or more of a network 120, a database 130, and an image capture unit 140 (e.g., a video camera). The output controller 108 represents any device equipped to output processed data to one or more of a database 150, a network 160, and a display 170 (e.g., an organic light emitting diode display (OLED), a liquid crystal display (LCD), or a cathode ray tube (CRT) display).

The memory 104 stores data and/or instructions that may be executed by processor 110. The instructions may comprise code for performing any and/or all of the techniques described herein. Memory 104 may be a dynamic random access memory (DRAM) device, a static random access memory (SRAM) device, Flash RAM (non-volatile storage), combinations of the above, or some other memory device known in the art. The memory 104 comprises a data store 107 and a regression module 106, and is adapted to communicate with the processor 110, the input controller 102, and/or the output controller 108. The regression module 106 comprises computer executable instructions for carrying out the regression process described below.

It should be apparent to one skilled in the art that computer system 100 may include more or less components than those shown in FIG. 1 without departing from the scope of the present invention. For example, computer system 100 may include additional memory, such as, for example, a first or second level cache, or one or more application specific integrated circuits (ASICs). Similarly, computer system 100 may include additional input or output devices.

Figure 2:
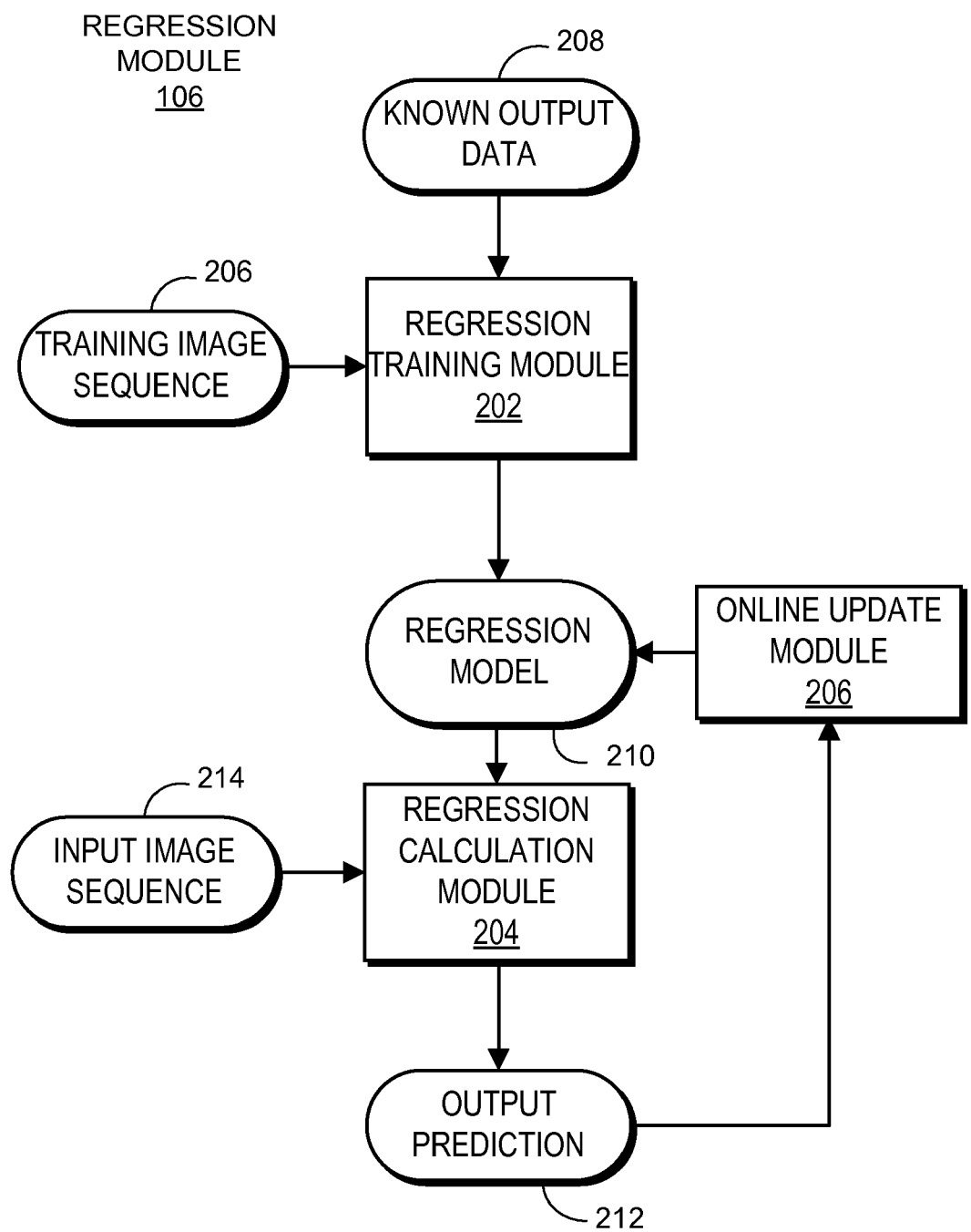
FIG. 2 is a block diagram illustrating a regression module for performing a regression process in accordance with an embodiment of the present invention.

FIG. 2 is a high-level block diagram illustrating an embodiment of the regression module 106. In one embodiment, the regression module 106 comprises computer executable instructions that are executed by the processor 110 of the computer system 100. The regression module 106 may further utilize data stored in data store 107 or data received by the input controller 102. Output data and intermediate data used by the regression module 106 may be outputted by output controller 108 and/or stored in data store 107. As will be apparent to one of ordinary skill in the art, alternative embodiments of the regression module 106 can be implemented in any combination of firmware, hardware, or software.

The regression module 106 comprises a regression training module 202, a regression calculation module 204, and an online update module 206. The regression training module 202 receives a sequence of two-dimensional (2D) training images from, for example, an external database 130, network 120, or image capture unit 140. The regression training module 202 also receives known output data 208 comprising motion tracking information for an object in the training images 206. In one embodiment, the known output data 208 comprises three-dimensional (3D) output data.

The nature of the training images 206 and known output data 208 may vary depending on the regression problem to be solved. For example, in one embodiment, the regression training module 202 is trained for a head pose estimation problem. In this embodiment, the training image sequence 206 may comprise images of head poses at various positions. The known output data 208 then comprises tracking information that includes representations of the head poses in the training image sequence 206. For example, the known output data 208 may comprise a sequence of vectors representing the yaw, pitch, and roll of the head poses in the training images 206.

In another embodiment, the regression training module 202 is trained for an object tracking problem. In this embodiment, the training images 206 may comprise images of an object to be tracked. Here, the known output data 208 may comprise, for example, known locations of the object in the sequence of images 206.

Using the training image sequence 206 and the known output data 208, the regression training module 202 learns a regression model 210 that describes the relationship between the information in the training images 206 and the known output data 208. Typically, the regression training module 202 is executed in an offline mode to obtain a preliminary regression model 210. The regression model 210 may be stored in data store 107 and is updated by the online updater 206 in the online process described below.

Using the regression model 210, the regression calculation module 204 calculates a regression on an input image sequence 214 to generate an output prediction 212. The output prediction 212 represents a prediction on the input image sequence 214 based on the learned regression model 210. The output prediction 212 may comprise, for example, a vector of joint angles describing a three-dimensional pose, a predicted object location, or any other set of object tracking information that the regression module 210 is configured to estimate.

The online update module 206 uses the output prediction 212 to perform online updates to the regression model 210. The online updates continue to refine the regression model 210 in an online learning process. This online learning process improves the accuracy of the regression process by adapting the regression model 210 to the recent input images 214. In one embodiment, the online update module 206 performs updates using an Online Sparse Matrix Gaussian Process (OSMGP). In contrast to conventional Gaussian Processes update techniques, the OSMGP is able to provide incremental updates to the Gaussian Process in O(n) time where n is the number of images (from training images 206 and input images 214) represented in the regression model 210. In one embodiment, these updates are processed in real-time as the input image sequence 214 is received (e.g., at 30 frames per second).

Gaussian Process Overview

In one embodiment, the regression training module 202 learns a regression model 210 based on a Gaussian Process (GP). A GP is a distribution over the space of functions, which is usually defined as a collection of random variables, any subset of which have a Gaussian distribution. GPs can be viewed as probabilistic kernel machines, and hence, can provide not only a mean value prediction but also the uncertainty measured in terms of standard deviation for a test sample (e.g., an input image from the input image sequence 214). A large standard deviation signals the absence of any training data in the neighborhood of the input sample, and provides an indication of poor generalization.

Generally, a Gaussian Process is defined by a mean function m(x) and a covariance function k(x, x'). A random function $f(x)$ distributed according to a GP is written as $f(x) \sim GP$ (m(x), k(x, x')). The GP is transformed into a probabilistic kernel machine by taking the covariance function to be a semi-positive definite Mercer kernel, such that the covariance between points $x_i$ and $x_j$ is given by $k(x_i, x_j)$.

The regression training module 202 learns the regression model 210 assuming the availability of n training inputs $X=\{x_{1:n}\}$ and corresponding outputs $y=\{y_{1:n}\}$. The training inputs X may comprise the sequence of n training images 206 while the output y comprises the known output data 208 discussed above.

Figure 3:
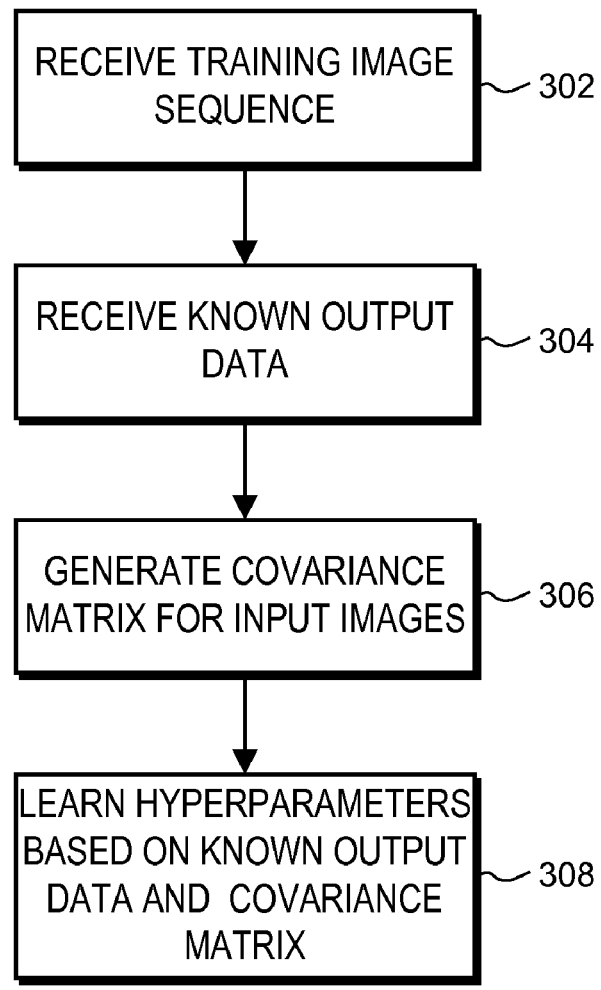
FIG. 3 is a flowchart illustrating a process for offline learning of a regression model in accordance with an embodiment of the present invention.

FIG. 3 illustrates an embodiment of a training process 300 executed by the regression training module 202 for learning the initial regression model 210 in the offline process. The regression training module 202 receives 302 the training image sequence, X (i.e., training images 206) and receives 304 the known output data y (i.e., known output data 208). The regression training module 202 then generates 306 a covariance matrix representing the covariance of the input training images 206. In one embodiment, the covariance function of the GP is given by the n×n Gram matrix K(X, X)=K.

The regression training module 202 learns 308 hyperparameters θ of the GP based on the covariance matrix, K, and the known output data y. The nature of the hyperparameters depends on the type of kernel function used in the GP. In one embodiment, the GP uses a Radial Basis Function (RBF) kernel. The RBF kernel is given as $$k(x_i, x_j) = c\exp\left\{\frac{\|x_i - x_j\|^2}{2\eta^2}\right\}$$

and the hyperparameters are θ=(c, η). In one embodiment, the regression training module 202 performs the step of learning 308 the hyperparameters by maximizing the marginal log-likelihood:

$$p(y \mid X, \theta) = -\frac{1}{2}\log|K + \sigma^2 I| - \frac{1}{2}y^T(K + \sigma^2 I)^{-1}y - \frac{n}{2}\log 2\pi \quad (1)$$

where I is the identity matrix of same dimensions as K and σ is the standard deviation of additive Gaussian noise. The regression training module 202 typically executes this learning process offline because Eq. (1) involves the computationally intensive calculation of inverting a potentially large Gram matrix. Additional details of GPs and their use in classification and regression tasks can be found in. Rasmussen, C. E., Williams, C.: "*Gaussian Processes for Machine Learning*" MIT Press (2006), the contents of which is incorporated by reference herein in its entirety.

Online Sparse Matrix Gaussian Process (OSMGP)

Figure 4:
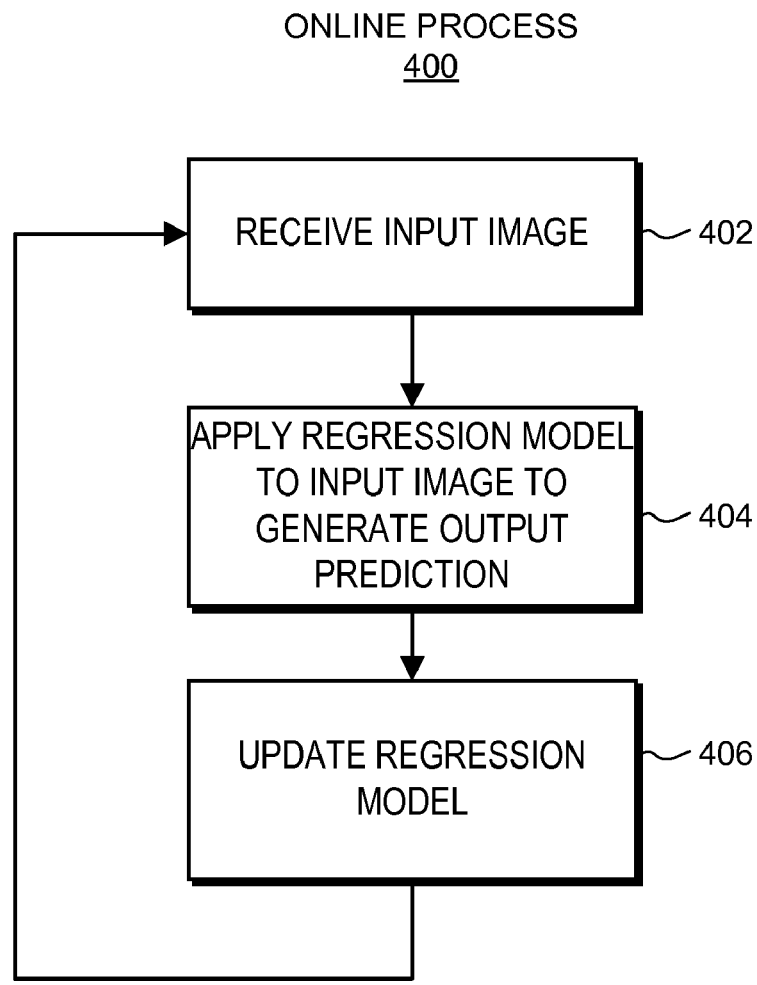
FIG. 4 is a flowchart illustrating a process for generating a regression-based output prediction and performing online updates to the regression model in accordance with an embodiment of the present invention.

Referring next to FIG. 4, an online process 400 is illustrated for generating an output prediction 212 based on an input image 214 and performing online updates to the regression model 210. The regression calculation module 204 receives 402 an input image from the input image sequence 214. The regression calculation module 204 applies 404 the regression model 210 to the input image to generate the output prediction 212. Generally, a regression-based prediction for a given test point x* (e.g., an input image from the image sequence 206) is given by the conditional distribution on the test output y*, given the training data X, Y and the test input x*. This conditional distribution is a Gaussian distribution given by p(y*|X, Y, x*)=N(μ*, Σ*) with the predictive mean μ* and covariance Σ* given by:

$$\mu^* = k^{*T}(K+\sigma^2 I)^{-1}y, \quad \Sigma^* = k(x^*, x^*) - k^{*T}(K+\sigma^2 I)^{-1}k^* \quad (2)$$

where $k^* = [k(x^*, x_1), k(x^*; x_2), \ldots, k(x^*; x_n)]$. The runtime prediction given by Eq. (2) is only O(n) for computing the mean prediction μ* assuming that the inverse Gram matrix has been previously computed and is stored in memory. As will be shown below, the mean prediction μ* can be found by computing $(K+\sigma^2 I)^{-1}y$ as the solution to the linear system $(R^T R)x=y$ where R is the upper triangular Cholesky factor of the Gram matrix. This linear system can be solved using two back-substitution operations. While in normal operation, back-substitution is an $O(n^2)$ operation, it is O(n) for sparse matrices, as will be the case below. The complexity of computing the variance is $O(n^2)$ when computed directly. However, the computation can also be reduced to O(n) using the OSMGP techniques described below.

After the regression calculation module 204 applies 404 the regression model 210, the online updater 206 updates 406 the regression model 210 based on the output prediction 212 according to the OSMGP described below. As the name suggests, OSMGP works under the assumption that the covariance matrix K of the GP is sparse. The use of kernel functions having local support results in most of the entries in the Gram matrix being close to zero since the kernel decays rapidly as the distance between the vectors being evaluated increases. Many commonly used infinite-dimensional kernels have local support, including, for example, the widely used Radial Basis Function (RBF) (also known as the Gaussian or squared exponential kernel). This allows the use of sparse matrix algorithms that can perform online updates in linear time and are also exact.

To ensure the sparsity of the covariance matrix, "compactified" kernel functions are used. This is because although kernels such as the RBF may produce a covariance matrix with many small entries, the entries in the matrix should be exactly zero for sparse matrix algorithms to be applicable. While thresholding the entries of the covariance matrix may seem the most straight-forward way to obtain a sparse matrix, this may result in the matrix not being positive definite. Compactifying the kernel function, i.e., modifying the kernel function to get one with compact support, ensures a positive definite matrix without compromising on the other characteristics of the kernel. For example, the RBF kernel can be compactified as $$k(x_i, x_j) = c\exp\left(\frac{(x_i - x_j)^2}{\eta^2}\right) \times \max\left(0, 1 - \left|\frac{x_i - x_j}{d}\right|\right),$$

where c and η are the RBF kernel parameters, and d defines the compact region over which the kernel has support. This modified kernel is positive definite. Examples of compactified kernel functions are described in further detail in Hamers, B., Suykens, J., Moor, B. D.: "*Compactly Supported RBF Kernels for Sparsifying the Gram Matrix in LS-SVM Regression Models.*" In: Proceedings of the International Conference on Artificial Neural Networks (2002) 720-726, the content of which is incorporated by reference herein in its entirety.

Unlike conventional GP algorithms, the OSMGP represents the covariance matrix as a sparse Cholesky factor. This is possible because the Cholesky factor of a sparse matrix is also sparse for some reordering of the variables. In the following discussion, the upper triangular Cholesky factor will be the quantity that is maintained and updated in the GP update.

Regression Model Updates

Figure 5:
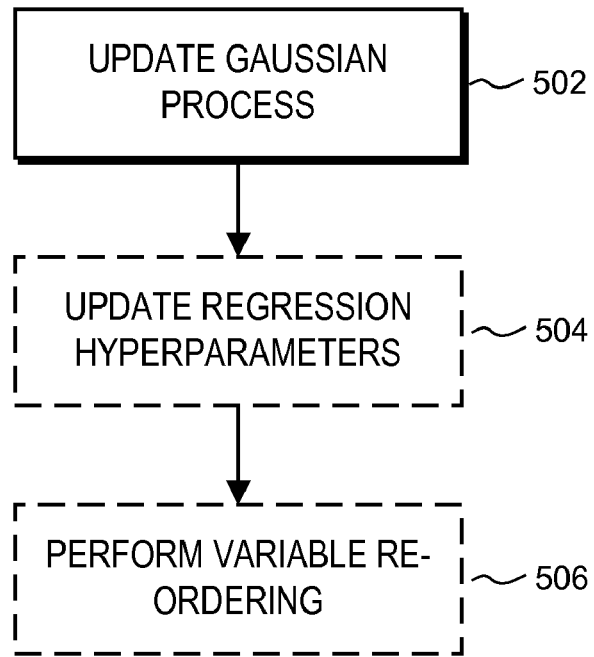
FIG. 5 is a flowchart illustrating a process for performing online updates to the regression model in accordance with an embodiment of the present invention.

FIG. 5 illustrates an embodiment of a process for updating 406 the regression model 210. The online updater 206 first updates 502 the Gaussian Process function f and covariance matrix K. In one embodiment, this step 502 comprises computing the GP posterior by taking into account the output prediction 214. Assuming at time t, the regression model 210 is given by $p_t(f)$, the online updater 206 updates the regression model 210 upon receiving the output prediction $y_{t+1}$ using Bayes law as $p_{t+1}(f) \propto p(y_{t+1}|f)p_t(f)$ where $p(y_{t+1}|f)$ is the measurement model. The GP closest to the true posterior is found in the Kullback-Leibler divergence sense. This is done through moment matching using the parametrization lemma discussed in Csato and Opper referenced above. Subsequently, the updated GP is given as:

$$\langle f \rangle_{t+1} = \langle f \rangle_t + q^{(t-1)}k_{t+1}, K_{t+1} = K_t + r^{(t-1)}k_{t+1}k_{t+1}^T \quad (3)$$

where $\langle \cdot \rangle$ denotes the expectation operation, $k_{t+1} = [K(x_{t+1}, x_1), \ldots, K(x_{t+1}, x_t)]^T$ and the update variables q and r are given as $$q^{(t+1)} = \frac{\partial}{\partial \langle f_{t+1} \rangle_t} = \ln \langle p(y_{t+1}|f_{t+1}) \rangle_t, \quad (4)$$

$$r^{(t+1)} = \frac{\partial^2}{\partial \langle f_{t+1} \rangle_t} = \ln \langle p(y_{t+1}|f_{t-1}) \rangle_t,$$

where $\langle \cdot \rangle$ is the expectation with respect to GP at time t. Updating 502 the GP function using Eq. (3) involves a O(n) update for the mean and an update for the covariance that is potentially $O(n^2)$. Here n is the total number of image samples presented thus far including the initial training images 206 and subsequent input images 214. However, as will be shown below with respect to FIG. 6, the update can be performed in O(n) if it is assumed that the covariance matrix is sparse. The update to the covariance matrix is then a rank one update to a sparse matrix where the dimensions of the matrix increase by one during the update. The following steps 504, 506 in FIG. 5 are optional and will be described in further detail below.

Figure 6:
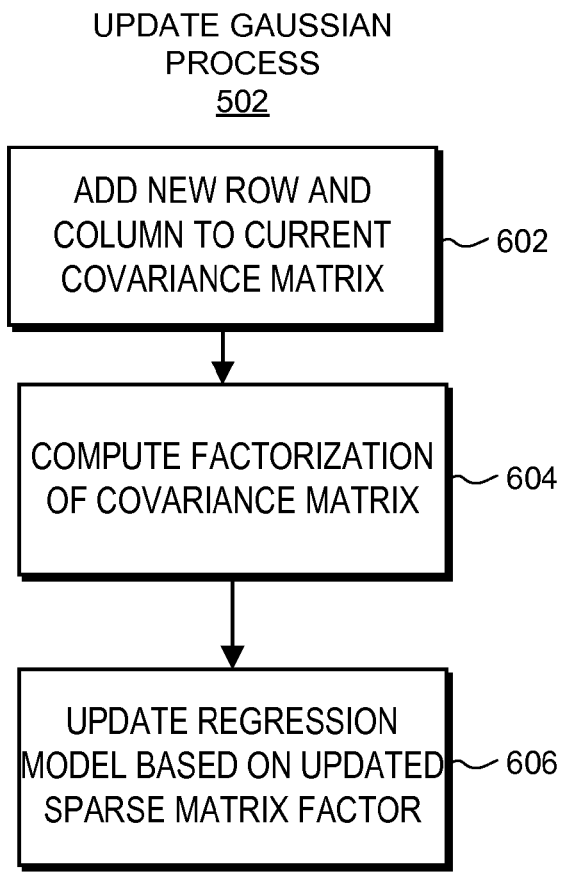
FIG. 6 illustrates examples of a process for applying a Gaussian Process update to the regression model in accordance with an embodiment of the present invention.

FIG. 6 illustrates an embodiment of a process for updating 502 the Gaussian Process according to the principles described above. It can be shown that when the Gram matrix is sparse, as is the case when kernels with local support are used, an efficient representation is to maintain and update a sparse matrix factor (e.g., a sparse Cholesky factor) of the Gram matrix instead of the matrix itself.

Figure 7:
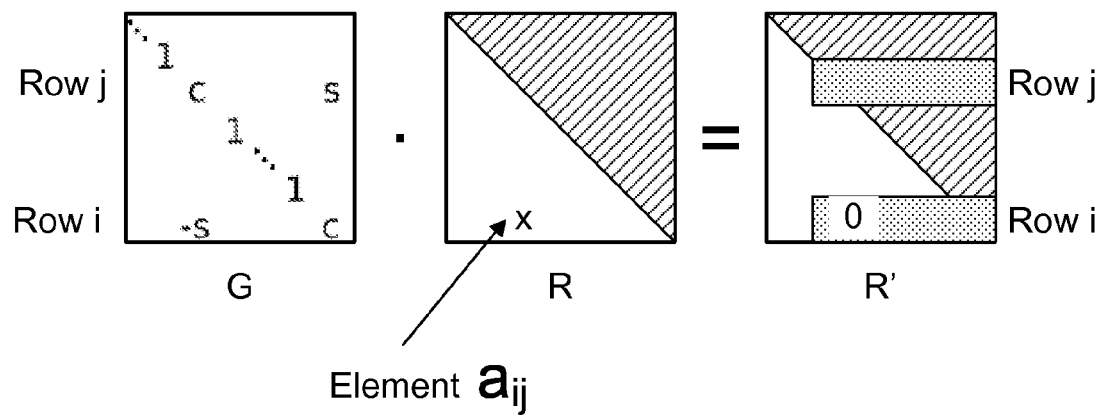
FIG. 7 is diagram graphically illustrating an application of a Givens rotation to a matrix in accordance with an embodiment of the present invention.

When a new input sample is received, a new row and column is added 602 to the covariance matrix. A factored representation of the covariance matrix is then computed 604 that includes a sparse matrix factor (e.g. a sparse Cholesky factor). Rather than re-computing the factorization every time a new input image is received, only the sparse matrix factor is maintained and updated. In one embodiment, the sparse matrix factor comprises an upper triangular Cholesky factor. One approach to efficient, incremental Cholesky factorization uses Givens rotations to zero out the entries below the diagonal, one at a time. The (i,j) entry, $a_{ij}$ of a matrix A can be zeroed out by applying the Givens rotation:

$$G \triangleq \begin{bmatrix} \cos\phi & \sin\phi \\ -\sin\phi & \cos\phi \end{bmatrix} \quad (5)$$

to rows i and j, with i>j, which represents a rotation in a two-dimensional subspace of the states. φ is chosen so that $a_{ij}$, the (i,j) entry of the matrix, becomes 0:

$$(\cos\phi, \sin\phi) = \begin{cases} (1, 0) & \text{if } \beta = 0 \\ \left( \frac{-\alpha}{\beta\sqrt{1+\left(\frac{\alpha}{\beta}\right)^2}}, \frac{1}{\sqrt{1+\left(\frac{\alpha}{\beta}\right)^2}} \right) & \text{if } |\beta| > |\alpha| \\ \left( \frac{1}{\beta\sqrt{1+\left(\frac{\alpha}{\beta}\right)^2}}, \frac{-\beta}{\sqrt{1+\left(\frac{\alpha}{\beta}\right)^2}} \right) & \text{otherwise} \end{cases}$$

where $\alpha \triangleq a_{ij}$ and $\beta \triangleq a_{jj}$. FIG. 7 illustrates an example application of a Givens rotation and shows how a Givens rotation can be applied to a matrix R which is triangular but for one entry (x) at location $a_{ij}$ in the matrix R. The Givens Matrix G is multiplied by the matrix R to yield the resulting matrix R'. Note that the single Givens rotation does not ensure that the resulting matrix R' is triangular since the operation may give non-zero values to other elements to the right of $a_{ij}$ in the ith and jth rows. After all the non-zero entries below the diagonal are zeroed out by application of Givens rotations, the upper triangular entries contain the updated Cholesky factor. Note that a sparse matrix yields a sparse Cholesky factor for an appropriate variable ordering. Additional details on Givens rotations are provided in Golub, G., Loan, C. V.: "*Matrix Computations*" John Hopkins University Press (1996), the content of which is incorporated by reference herein in its entirety.

Applying Givens rotations yields an efficient update algorithm that can provide exact incremental updates to the GP for kernel functions with local support. In general, the maximum number of Givens rotations for adding a new row of size n is $O(n^2)$. However, as both the covariance matrix and the new row are sparse, the update can be performed using only O(n) Givens rotations. In practice, the update is typically even faster because only a small number of entries are recomputed rather than the whole matrix. The online update module 206 updates 606 the regression model 210 based on the updated sparse matrix factor obtained above. The Cholesky factor is then used to obtain the inverse matrix for the prediction calculation in Eq. (2), thus eliminating the need to compute the inverse of K directly.

Periodic Variable Reordering and Hyperparameter Optimization

Referring back to FIG. 5, after updating 502 the Gaussian Process function and covariance matrix, the online updater 206 may perform the optional steps of updating 504 the regression hyperparameters and executing 506 a variable reordering. In one embodiment, these steps 504, 506 are performed only after every N input images (e.g. N=100 or N=1000). The value for N may be selected experimentally based on the nature of the input data and the desired trade-off between accuracy and speed.

Updating 504 the hyperparameters of the GP based on the input images during runtime further refines and improves the regression model 210. Hyperparameter updates can be performed periodically using Eq. (1) described above. Once new hyperparameters are available, the covariance matrix is recomputed completely and re-factorized using a batch Cholesky decomposition. This operation could take $O(n^3)$ in theory but is closer to $O(n^2)$ in practice if sparse Cholesky decomposition methods are used. Techniques for Cholesky decomposition are described in further detail in Kaess, M., Ranganathan, A., Dellaert, F: "*Fast Incremental Square Root Information Smoothing*", In: Intl. Joint Conf. on Artificial Intelligence. (2007) 2129-2134, the content of which is incorporated by reference herein in its entirety.

Variable reordering may also be periodically performed 506 to compensate for fill-in that may occur in the Gram matrix. Fill-in may occur as Givens rotations are applied to incrementally update the GP. Fill-in is defined as non-zero entries beyond the sparsity pattern of the Gram matrix, i.e., entries that are zero in the Gram matrix become non-zero in the Cholesky factor. This occurs because the Cholesky factor of a sparse matrix is guaranteed to be sparse for some variable orderings but not for all of them. Variable reordering order can be used to maintain the sparsity of the Cholesky factor of the Gram matrix and maintain the efficient runtime of the OSMGP.

Variable reordering avoids fill-in using a heuristic to efficiently find a good column ordering. The order of the columns (and rows) in the Gram matrix influences the variable elimination order and therefore also the resulting number of entries in the Cholesky factor. Examples of efficient heuristics for variable reordering include COLAMD (COLumn Approximate Minimum Degree) ordering and Nested Dissection as described in Davis, T., Gilbert, J., Larimore, S., Ng, E.: "*A Column Approximate Minimum Degree Ordering Algorithm*" ACM Trans. Math. Softw. 30 (2004) 353-376; and Kernighan, B., Lin, S.: "*An Efficient Heuristic Procedure for Partitioning Graphs*" The Bell System Technical Journal 49 (1970) 291-307, the contents of which are incorporated by reference herein in their entirety.

Reordering the variables also involves a re-factorization of the Gram matrix with its attendant higher complexity. In one embodiment, variable reordering and hyperparameter optimization using Eq. (1) are combined in a single step, thus using only a single re-factorization. When combined with incremental updates, this avoids fill-in, relearns hyperparameters to provide a responsive model, and still yields a fast algorithm.

Thus, even though the Cholesky factor of the Gram matrix may become dense due to repeated applications of Givens rotations as training points are added, variable reordering can be applied to restores sparsity of the matrix. In addition, hyperparameters of the GP can optionally be automatically learned using a maximum likelihood method. Both of these updates can be performed at the expense of introducing a periodic quadratic update to re-compute the Gram matrix.

Matrix Downdates and Constant Time Operation

The complete OSMGP algorithm as described above has $O(n)$ runtime complexity. This is because the GP update step described by Eq. (3) has $O(n)$ runtime due to the use of Givens rotations while the regression prediction described by Eq. (2) also has $O(n)$ runtime since it can be implemented using sparse back-substitution. While the linear runtime complexity may be sufficient for many applications, in many other situations a constant time scaling is desired for at least the prediction calculation. Furthermore, since the covariance matrix in the above case grows with the number of training samples, storage requirement also increases over time. In one embodiment an approximation is introduced to the process described above in order to obtain a constant time algorithm (and constant storage space for the covariance matrix). This approximation is exact except for the posterior projection determined by Eq. (4).

One approach to achieving constant runtime operation is based on a sliding window approach to least squares problems, where old input data points are successively discarded as new ones arrive. Examples of a sliding window approach is described in further detail in Zhao, K., Fuyun, L., Lev-Ari, H., Proakis, J: "*Sliding Window Order-Recursive Least-Squares Algorithms*" IEEE Trans. Acost., Speech, Signal Processing 42 (1994) 1961-1972, the content of which is incorporated by reference herein in its entirety.

For the OSMGP, the online updater 206 discards an old training sample for every new one that is provided, thus keeping the number of samples based on which the GP is learned constant. This technique is advantageous because it is more likely that future test samples are similar to the most recently observed samples during online operation. However, other discarding strategies can also be accommodated in various alternative embodiments.

Maintaining the covariance matrix at a fixed size of W×W, where W is the window size, makes both the prediction and the GP updates have $O(W)$ time instead of $O(n)$. Further, even the hyperparameter optimization and variable ordering can be done in $O(W^2)$. Note that W can be quite large (e.g., in the thousands) and yet, can be done efficiently, since all the operations are carried out on sparse matrices.

Figure 8:
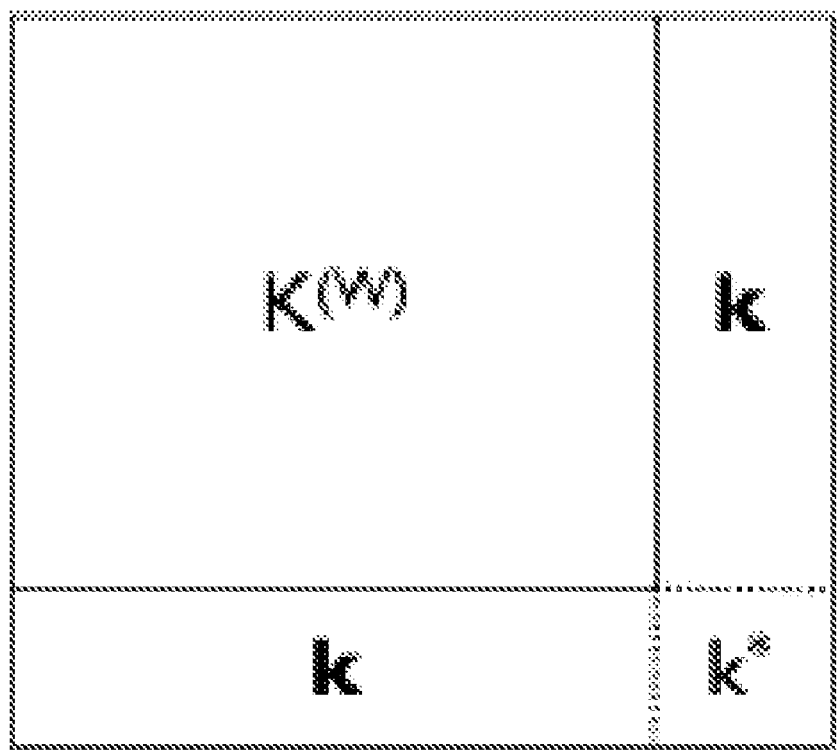
FIG. 8 is a diagram graphically illustrating matrix components used in a downdating process in accordance with an embodiment of the present invention.

The operation of updating the GP when discarding a training sample in this constant time, constant space algorithm (for fixed U) is now described. Discarding a training sample involves deleting a row and a column from the covariance matrix. Inverting the rank one update from Eq. (3), the update to the GP can be computed using a rank one downdate of the covariance matrix. Assuming, without loss of generality, that the (W+1)th row and column are to be removed from a (W+1)×(W+1) matrix $\tilde{K}$ to get a downdated W×W matrix K, this can be done as $$K = K^{(W)} - \frac{kk^T}{k^*}$$

where k, k*, and $K^{(W)}$ are defined as in FIG. 8. Here, k is the $(W+1)^{th}$ row (or transposed column) of $\tilde{K}$, k* is the entry at the $(W+1)^{th}$ column and $(W+1)^{th}$ row of $\tilde{K}$, and $K^{(W)}$ is the matrix including the first W rows and W columns of $\tilde{K}$. The rank one downdate can be performed efficiently using Hyperbolic rotations, which are defined analogous to Givens rotations. To zero out the (i,j) entry, $a_{ij}$ of a matrix A, the online updater 206 applies the Hyperbolic rotation $$H \triangleq \begin{bmatrix} \cosh\phi & -\sinh\phi \\ -\sinh\phi & \cosh\phi \end{bmatrix} \quad (6)$$

to rows i and j, with i>j. The parameter φ is chosen so that $a_{ij}$, the (i,j) entry of the matrix, becomes 0:

$$(\cosh\phi, \sinh\phi) = \begin{cases} (1, 0) & \text{if } \beta = 0 \\ \left(\dfrac{\alpha}{\beta\sqrt{1-\left(\frac{\alpha}{\beta}\right)^2}}, \dfrac{1}{\sqrt{1-\left(\frac{\alpha}{\beta}\right)^2}}\right) & \text{if } |\beta| > |\alpha| \\ \left(\dfrac{1}{\sqrt{1-\left(\frac{\beta}{\alpha}\right)^2}}, \dfrac{\beta}{\alpha\sqrt{1-\left(\frac{\beta}{\alpha}\right)^2}}\right) & \text{otherwise} \end{cases}$$

where $\alpha \triangleq a_{jj}$ and $\beta \triangleq a_{ij}$. As with the Givens rotations, the hyperbolic rotations are applied until all the elements of the row and column in question have been zeroed out. This is a linear time operation for sparse matrices. Hyperbolic rotations are described in further detail in Golub, G. et al referenced above.

Although hyperbolic rotations can be numerically unstable, such instability usually does not occur when the initial and final matrices after the downdate have full rank, as is the case here. In the rare event that a numerical instability occurs, the unstable case can be dealt with using more sophisticated downdate techniques. Examples of such techniques are described in Bjorck, A., Park, H., Elden, L: "*Accurate downdating of Least-Square Solutions*". Siam Journal on Matrix Analysis and Applications 15 (1994) 549-568, the content of which is incorporated by reference herein in its entirety.

Figure 9:
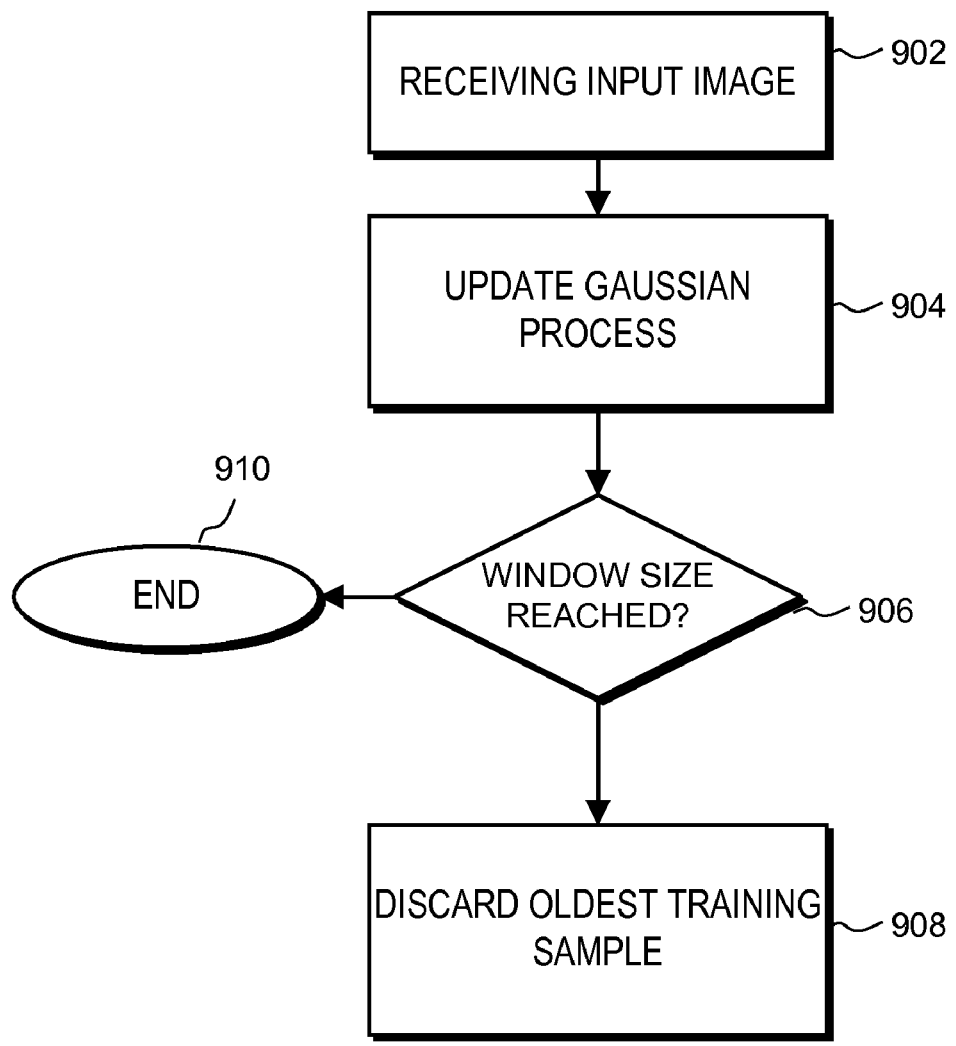
FIG. 9 is a flowchart illustrating a constant time online sparse matrix Gaussian process in accordance with an embodiment of the present invention.

The approximate, constant time OSMGP algorithm described above is summarized in FIG. 9. A new input image is received 902 and used to update 904 the GP using Givens rotations as described above with reference to FIG. 6. The online updater 206 determines 906 if the window size W has been reached. If the window size W has not been reached, then no downdating is necessary and the process ends 910. However, if the window size has been reached, the oldest training sample is discarded 908 by removing the corresponding row and column from the Cholesky factor of the covariance matrix, using hyperbolic rotations for downdating.

This use of matrix downdating using hyperbolic rotations allows the online updater 206 to learn the hyperparameters of the GP in constant time. Hyperbolic rotations are used to incrementally recompute a matrix factorization when a row and column from the matrix are removed. This operation can be performed in O(n) time similar to Givens rotations. Downdating enables the Gram matrix to be maintained at a constant size by removing a training point from the training set whenever a new point is added, so that the size of the training set does not change. Hence, re-computing the Gram matrix after updating the hyperparameters can be done in constant time.

Additional Embodiments and Applications

The above described processes can be applied to various challenging computer vision applications, such as, for example, head pose estimation and object tracking. For example, in one embodiment, an OSMGP-based head pose estimation system provides fully automatic real-time head pose tracking. In this embodiment, a cascade detector performs face detection while a visual tracker generates tracking information. Examples of such tracking systems are described in Viola, P., Jones, M.: "*Rapid Object Detection Using a Boosted Cascade of Simple Features*". In: IEEE Conf. on Computer Vision and Pattern Recognition. Volume 1 (2001) 511-518; and Ross, D., Lim, J., Lin, R. S., Yang, M. H.: "*Incremental Learning for Robust Visual Tracking*" International Journal of Computer Vision 1-3 (2008) 125-141, the contents of which are incorporated by reference herein in their entirety.

The tracked face images are used as the training image sequence 206 to perform offline training, and as the input image sequence 216 for online training. The training images 206 and input images 216 may be, for example, 32×32 pixel images. In one embodiment, histogram equalization may be performed on the tracker output (i.e. training image sequence 206 or input image sequence 216) to diminish or remove illumination changes. Since the roll angle of the head pose is given by tracker output, only the yaw and pitch angles are learned by the regression model 210. A dimensionality reduction algorithm such as Principal Component Analysis (PCA) projects face images from the input image sequence 214 onto a reduced dimensional space on which the regression model 210 is learned. The regression calculation module 204 then provides predications of the pitch and yaw angles of the head pose while the online updater 206 updates the regression model 210 in real-time based on the output predictions 212.

In another embodiment, the OSMGP-based visual tracking system applies the OSMGP regression to a visual tracking problem. In this embodiment, "seed images" are used as the training image sequence 206, in which the location of the object of interest is known and provided to the regression training module 202 by the known output data 208. The object extracted from these seed images is perturbed along the two translation axes to obtain training images. A regression model 210 from the image to the displacement is learned based on the training images. Perturbed training images can be generated using a window along both translation axes (e.g., a 40 pixel window). The regression calculation module 204 then provides predications of the object location in a set of input images 214 while the online updater 206 updates the regression model 210 in real-time based on the output predictions 212.

Reference in the specification to "one embodiment" or to "an embodiment" means that a particular feature, structure or characteristic described in connection with the embodiments is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

The invention claimed is:

1. A method for generating tracking information for an object in a sequence of input images, the method comprising:
receiving a first input image from the sequence of input images;
receiving a regression model including a covariance matrix represented by a sparse matrix factor, the covariance matrix representing covariance of previously received input images;
applying the regression model to the first input image to generate an output prediction representing first tracking information for the object in the first input image; and
generating an updated regression model by applying an update to the sparse matrix factor, the update based on the output prediction for the first input image, wherein applying the update to the sparse matrix factor comprises an O(n) runtime operation, where n is a number of received images.

2. The method of claim 1, further comprising:
receiving a second input image from the sequence of input images;
applying the updated regression model to the second input image to generate a second output prediction representing second tracking information for the object in the second input image.

3. The method of claim 1, wherein the regression model further includes hyperparameters learned in an offline learning process, comprising steps of:
receiving a sequence of training images;
receiving known output data comprising known tracking information for a training object in the sequence of training images;
generating the covariance matrix based on the sequence of training images; and
learning the hyperparameters of the regression model based on the covariance matrix and the known output data.

4. The method of claim 3, wherein learning the hyperparameters of the regression model comprises maximizing a marginal log likelihood function.

5. The method of claim 1, wherein generating an updated regression model comprises:
updating the covariance matrix to include covariance of the first input image;
computing a matrix factorization of the covariance matrix to generate an updated sparse matrix factor; and
updating the regression model based on the updated sparse matrix factor.

6. The method of claim 5, wherein computing the matrix factorization comprises applying a Givens rotation to the covariance matrix to zero out entries of the covariance matrix below a diagonal of the covariance matrix and to generate an updated sparse matrix factor.

7. The method of claim 1, wherein the sparse matrix factor comprises a sparse Cholesky factor of the covariance matrix.

8. The method of claim 1, wherein generating an updated regression model comprises:
updating hyperparameters of the regression model based on the first input image and the output prediction; and
updating the sparse matrix factor based on the updated hyperparameters.

9. The method of claim 1, wherein generating an updated regression model comprises:
applying a variable reordering to the covariance matrix of the regression model to maintain sparsity of the covariance matrix; and
updating the sparse matrix factor based on the reordered covariance matrix.

10. A method for generating tracking information for an object in a sequence of input images, the method comprising:
receiving a first input image from the sequence of input images;
receiving a regression model including a covariance matrix represented by a sparse matrix factor, the covariance matrix representing covariance of previously received input images;
applying the regression model to the first input image to generate an output prediction representing first tracking information for the object in the first input image; and generating an updated regression model by applying an update to the sparse matrix factor, the update based on the output prediction for the first input image, wherein generating an updated regression model further comprises:
  removing an input image from the covariance matrix such that the covariance matrix maintains a constant size when a new input image is added;
  computing a matrix factorization of the covariance matrix to generate an updated sparse matrix factor; and
  updating the regression model based on the updated sparse matrix factor.

11. The method of claim 10, wherein computing the matrix factorization comprises applying a Hyperbolic rotation to the covariance matrix to zero out entries of the covariance matrix below a diagonal of the covariance matrix and to generate an updated sparse matrix factor.

12. The method of claim 10, wherein removing the input image from the covariance matrix comprises removing an oldest input image from the covariance matrix.

13. The method of claim 10, wherein the regression model further includes hyperparameters learned in an offline learning process, comprising steps of:
  receiving a sequence of training images;
  receiving known output data comprising known tracking information for a training object in the sequence of training images;
  generating the covariance matrix based on the sequence of training images; and
  learning the hyperparameters of the regression model based on the covariance matrix and the known output data.

14. The method of claim 10, wherein generating the updated regression model further comprises:
  updating hyperparameters of the regression model based on the first input image and the output prediction; and
  updating the sparse matrix factor based on the updated hyperparameters.

15. A computer program product comprising a non-transitory computer readable storage medium storing computer executable code for generating tracking information for an object in a sequence of input images, the computer executable code when executed performing the steps of:
  receiving a first input image from the sequence of input images;
  receiving a regression model including a covariance matrix represented by a sparse matrix factor, the covariance matrix representing covariance of previously received input images;
  applying the regression model to the first input image to generate an output prediction representing first tracking information for the object in the first input image; and
  generating an updated regression model by applying an update to the sparse matrix factor, the update based on the output prediction for the first input image, wherein generating an updated regression further comprises:
    removing an input image from the covariance matrix such that the covariance matrix maintains a constant size when a new input image is added;
    computing a matrix factorization of the covariance matrix to generate an updated sparse matrix factor; and
    updating the regression model based on the updated sparse matrix factor.

16. The computer program product of claim 15, wherein computing the matrix factorization comprises applying a Hyperbolic rotation to the covariance matrix to zero out entries of the covariance matrix below a diagonal of the covariance matrix and to generate an updated sparse matrix factor.

17. The computer program product of claim 15, wherein removing the input image from the covariance matrix comprises removing an oldest input image from the covariance matrix.

18. The computer program product of claim 15, wherein the regression model further includes hyperparameters learned in an offline learning process, comprising steps of:
  receiving a sequence of training images;
  receiving known output data comprising known tracking information for a training object in the sequence of training images;
  generating the covariance matrix based on the sequence of training images; and
  learning the hyperparameters of the regression model based on the covariance matrix and the known output data.

19. The computer program product of claim 15, wherein generating the updated regression model further comprises:
  updating hyperparameters of the regression model based on the first input image and the output prediction; and
  updating the sparse matrix factor based on the updated hyperparameters.

20. A computer program product comprising a non-transitory computer readable storage medium storing computer executable code for generating tracking information for an object in a sequence of input images, the computer executable code when executed performing the steps of:
  receiving a first input image from the sequence of input images;
  receiving a regression model including a covariance matrix represented by a sparse matrix factor, the covariance matrix representing covariance of previously received input images;
  applying the regression model to the first input image to generate an output prediction representing first tracking information for the object in the first input image; and
  generating an updated regression model by applying an update to the sparse matrix factor, the update based on the output prediction for the first input image, wherein applying an update to the covariance matrix comprises an $O(n)$ runtime operation, where n is a number of received images.

21. The computer program product of claim 20, the computer executable code when executed further performing the steps of:
  receiving a second input image from the sequence of input images;
  applying the updated regression model to the second input image to generate a second output prediction representing second tracking information for the object in the second input image.

22. The computer program product of claim 20, wherein the regression model further includes hyperparameters learned in an offline learning process, comprising steps of:
  receiving a sequence of training images;
  receiving known output data comprising known tracking information for a training object in the sequence of training images;
  generating the covariance matrix based on the sequence of training images; and
  learning the hyperparameters of the regression model based on the covariance matrix and the known output data.

23. The computer program product of claim 22, wherein learning the hyperparameters of the regression model comprises maximizing a marginal log likelihood function.

24. The computer program product of claim 20, wherein generating an updated regression model comprises:
    updating the covariance matrix to include covariance of the first input image;
    computing a matrix factorization of the covariance matrix to generate an updated sparse matrix factor; and
    updating the regression model based on the updated sparse matrix factor.

25. The method of claim 24, wherein computing the matrix factorization comprises applying a Givens rotation to the covariance matrix to zero out entries of the covariance matrix below a diagonal of the covariance matrix and to generate an updated sparse matrix factor.

26. The computer program product of claim 20, wherein the sparse matrix factor comprises a sparse Cholesky factor of the covariance matrix.

27. The computer program product of claim 20, wherein generating an updated regression model comprises:
    updating hyperparameters of the regression model based on the first input image and the output prediction; and
    updating the sparse matrix factor based on the updated hyperparameters.

28. The computer program product of claim 20, wherein generating an updated regression model comprises:
    applying a variable reordering to the covariance matrix of the regression model to maintain sparsity of the covariance matrix; and
    updating the sparse matrix factor based on the reordered covariance matrix.

* * * * *